United States Patent [19]

Gullickson

[11] Patent Number: 5,423,909
[45] Date of Patent: Jun. 13, 1995

[54] SLIP-RESISTANT COMPOSITION AND METHOD

[76] Inventor: Larry L. Gullickson, 5701 Anson Rd., Greensboro, N.C. 27407

[21] Appl. No.: 240,440

[22] Filed: May 10, 1994

[51] Int. Cl.$^6$ ................................................ C09K 3/14
[52] U.S. Cl. ........................................ 106/36; 252/160; 252/140; 252/174.25; 106/287.34
[58] Field of Search ............................ 106/36, 287.34; 252/159, 160, 163, 174.25, 140

[56] References Cited

U.S. PATENT DOCUMENTS

| | | | |
|---|---|---|---|
| 2,739,129 | 3/1956 | Manchot | 252/160 |
| 4,261,849 | 4/1981 | Benjaminson | 252/160 |
| 4,289,640 | 9/1981 | Falivene | 252/140 |
| 4,990,188 | 2/1991 | Micek et al. | 106/36 |
| 5,158,710 | 10/1992 | VanEenam | 252/539 |

Primary Examiner—Mark L. Bell
Assistant Examiner—Michael Marcheschi

[57] ABSTRACT

A slip-resistant composition and method is provided to render a floor or other walkway surface temporarily slip-resistant. The invention consists of a powdered carbonate and silicon dioxide mixture which will absorb liquids such as grease and water to render the area slip-resistant and provides a gritty walkway surface that feels slip-resistant to the walker. The invention is particularly useful in restaurants and other high traffic areas which are susceptible to multiple slippery floor areas during relatively short periods of peak activity. Examples are lunch and dinner rush when there is no time for cleaning small spills and laden grease on the floor. It can also help any business during rain, snow or other moisture periods to assist in making entrances slip-resistant.

8 Claims, 1 Drawing Sheet

SLIP-RESISTANT COMPOSITION AND METHOD

BACKGROUND OF THE INVENTION

1. Field Of The Invention

The invention herein pertains to a dry chemical composition useful in rendering any walkway surface slip-resistant and particularly pertains to an effective method of treating floors in restaurants and other high traffic areas.

2. Description Of The Prior Art And Objectives Of The Invention

Businesses that employ people that are physically active in carrying out their work tasks are growing increasingly concerned about insurance costs, lost time and injuries which result from job related accidents. Of particular concern are accidents which occur in the food service sector, such as in restaurants, as waiters, waitresses, cooks, dishwashers and others quickly move from the serving areas to the kitchen and back. Slips and falls by employees are one of the greatest concerns in the food service industry today and account for about fifty percent of the total accidents in restaurants. Various manufacturing facilities, retail shops, warehouses and other work areas likewise experience problems from employees falling as they move about, but generally to a lesser degree. Most fast food restaurants have quarry tile, vinyl tile, wooden or concrete floor surfaces which are generally hard, some of which are porous while others are nonporous to prevent stains and absorption of water, grease, oils and semi-solids which constantly fall thereon. Porous type floors, when cleaned improperly, can become polymerized and less porous preventing absorption and making the floor unsafe for walking. This problem is common in restaurants. As sanitation is a primary concern in restaurants, hard porous floor surfaces allow for quick and easy cleaning, yet inadvertent water and grease spills during peak business hours create potential hazards which are temporarily tolerated during busy times. Small water and grease spills can translate into accidents requiring thousands of dollars of compensation and medical expenses for the injured employee in addition to the loss of experienced workers who must often undergo months of pain, suffering and physical rehabilitation.

The wearing of rubber soled shoes has been encouraged in the past among restaurant workers to increase traction, however such shoe soles can often quickly become glazed and slippery and not all employees wear rubber soled shoes. Various types of anti-slip mats and strips have also been utilized which are sometimes effective in preventing slips and falls in one area of a restaurant but unavailable or inconvenient for use in another area.

Thus, with the problems, costs and injuries known and associated with slippery floors and floor anti-slip devices, the present invention was conceived.

One of its objectives is to provide an inexpensive dry, powdered composition which can be easily applied to render the floor slip-resistant during busy times when there is no other option to prevent such accidents.

It is yet another objective of the present invention to provide a chemical composition which will mix with or absorb inadvertent liquid spills, yet which is water soluble and will allow cleaning with a water rinse.

It is also an objective of the present invention to provide a convenient applicator and method of using the same to render slick, high traffic, liquid laden floors slip-resistant.

It is still another objective of the present invention to provide a dry chemical composition which is relatively inexpensive, non-staining, non-corrosive and easy to use by inexperienced personnel.

It is a further objective of the present invention to provide a method for forming a chemical composition for use as a slip resistant material on wet or greasy surfaces.

It is another objective to make employees and any other person feel more secure on hazardous walkway surfaces.

It is another objective to provide temporary slip protection during busy periods when there is no time for normal maintenance or cleaning.

Various other objectives and advantages of the present invention become apparent to those skilled in the art as a more detailed description is set forth below.

SUMMARY OF THE INVENTION

The aforesaid and other objectives are realized by providing a chemical composition formed by blending industrial sodium bicarbonate, industrial sodium carbonate and industrial silicon dioxide in powdered form. The mixture is homogeneously blended with 65% industrial sodium carbonate, 30% industrial sodium bicarbonate and 5% industrial silicon dioxide. Colorants and suitable perfumes or masking agents may be added as desired. Once the ingredients have been blended they can be packaged in moisture resistant bags and conventional cleanser type cans which have top apertures allowing the powdered mixture to be sprinkled. Applying the powdered mixture is carried out by manually sifting it from the conventional can onto a hard surface, such as a quarry tile floor, which has liquid thereon. It can also be poured from a bag within a box onto water, grease, ice spills or the like. The slip-resistant amount is employed, dependent on the particular size, area and amount of liquid to be absorbed or combated. After use, clean up of the treated floor area described above can be easily accomplished by rinsing with water, as in normal mopping.

DESCRIPTION OF THE PREFERRED EMBODIMENTS AND DRAWING

Figure 1:
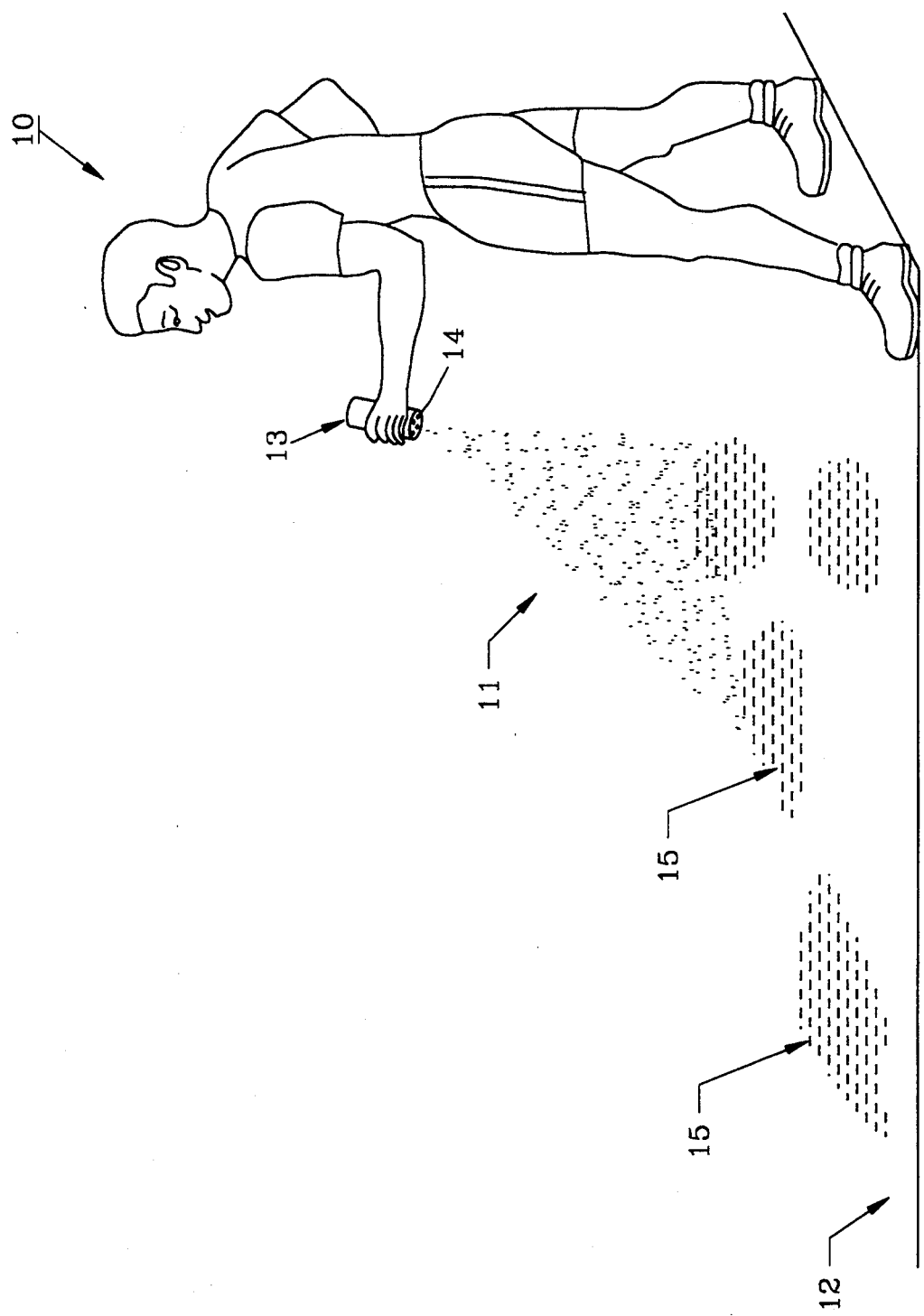
FIG. 1 shows a typical manual application of the slip-resistant composition from a conventional sprinkle can.

The preferred slip-resistant composition consists essentially of a homogeneous mixture of 65% by weight of industrial grade sodium carbonate, 30% by weight of industrial grade sodium bicarbonate and 5% by weight of industrial silicon dioxide. This mixture is blended in a conventional granular tumbler or agitator until thoroughly mixed. Suitable coloring agents, perfumes or the like can be added as desired. The mixture is then packaged in bulk or individual containers for dispensing. It has been found desirable to package the mixture in one pound, five ounce containers having a conventional, openable, porous top for sprinkling the mixture on floors or other surfaces.

The preferred method of utilizing the invention consists of dispensing it manually such as by sprinkling it onto a liquid laden spot or floor area as may be formed by ice, water or grease falling or developing on a hard floor surface. The slip-resistant amount of the composition applied to the particular spot or area depends on the amount of liquid, moisture or grease present to render the area temporarily slip-resistant under normal walking conditions. It is understood that the composition is generally not used in areas of large amounts of liquid which form puddles, but rather is temporarily used where liquids such as water, oils, greases are inadvertently splattered or are present on floors, around stoves, food serving areas, access or hallways and the like in relatively small amounts. If greater amounts of water, oils, greases or moisture are present, normal cleaning or maintenance is generally required such as by mopping, squeegeeing or otherwise removing of such large amounts. However, when minimal amounts of liquids are present on the floor, as may occur from spills, drainage, drippage, a quick sprinkle of an appropriate amount of the composition will render the moist area slip-resistant, without the need for extensive maintenance.

The slip-resistant composition as described herein is particularly useful around kitchens, food preparation areas, access areas where food is frequently transferred and other locations which generally have a hard, slick floor surface to provide ease in cleaning. When wet, such areas are generally exceedingly hazardous to those walking thereon. The slip-resistant composition can be quickly, easily applied to render the surface slip-resistant and after use can be conveniently removed by a water rinse, mopping or the like.

In FIG. 1, user 10 is seen sprinkling slip-resistant composition 11 onto floor 12 which consists of a hard surface quarry tile floor. Composition 11 is a dry, powdered carbonate mixture formed from 65% by weight industrial sodium carbonate, 30% by weight of industrial sodium bicarbonate and 5% by weight of industrial silicon dioxide. Conventional sprinkle can 13 has a porous top 14 to allow composition 11 to flow freely therefrom. Composition 11 is applied in an amount to combat slip hazard 15 present, which may be for example a grease, water or mixture thereof, to render floor 12 temporarily slip-resistant. Under certain circumstances, one ounce of composition 11 will absorb on contact approximately ten times the liquid present, although more or lesser amounts may be necessary under particular conditions. This composition employs industrial silicon dioxide to absorb water whereas the industrial sodium carbonate and industrial sodium bicarbonate absorb and combat grease and oil.

The exact mixture or ratio of the chemical composition shown herein can be varied, modified and/or changed by those skilled in the art without departing from the scope of the invention as defined in the claims set out below.

I claim:

1. A slip-resistant composition consisting of a homogeneous mixture of sodium carbonate, sodium bicarbonate and silicon dioxide, said mixture consisting of 30% by weight of sodium bicarbonate, 65% by weight of sodium carbonate and 5% by weight of silicon dioxide.

2. A method of rendering a slippery surface temporarily slip-resistant for walking upon comprising the said mixture consisting of 30% by weight of sodium bicarbonate, 65% by weight of sodium carbonate and 5% by weight of silicon dioxide
   (a) forming a dry chemical mixture consisting of sodium carbonate, sodium bicarbonate, silicon dioxide, and
   (b) applying said mixture to the surface.

3. The method of claim 2 wherein the slippery surface is a greasy surface.

4. The method of claim 2 wherein the slippery surface is a wet surface.

5. The method of claim 2 wherein the step of applying the dry chemical mixture comprises applying a slip-resistant amount of the dry mixture to the slippery surface.

6. The method of claim 2 wherein the step of applying the dry chemical mixture comprises sprinkling the dry chemical mixture onto the slippery surface.

7. The method of claim 2 wherein the step of applying the dry chemical mixture comprises pouring the dry chemical mixture onto the slippery surface.

8. A method of forming a slip-resistant surface, comprising the steps of:
   (a) forming a homogeneous mixture consisting of 30% by weight of sodium bicarbonate, 65% by weight of sodium carbonate and 5% by weight of silicon dioxide; and
   (b) treating a slippery surface by placing a slip-resistant amount of the mixture onto the slippery surface.

* * * * *